United States Patent [19]

Caveney et al.

[11] Patent Number: 5,469,893
[45] Date of Patent: Nov. 28, 1995

[54] TAB AND SLOT FIBER OPTIC FITTING

[75] Inventors: Jack E. Caveney, Hinsdale; Robert Nicoli, Glenwood, both of Ill.

[73] Assignee: Panduit Corp., Tinley Park, Ill.

[21] Appl. No.: 172,519

[22] Filed: Dec. 21, 1993

[51] Int. Cl.$^6$ ........................................ F16L 9/22
[52] U.S. Cl. ................. 138/162; 138/92; 138/157; 138/166; 174/683; 174/101
[58] Field of Search .................... 138/162, 92, 157, 138/166, 168; 174/68.3, 101

[56] References Cited

U.S. PATENT DOCUMENTS

| | | |
|---|---|---|
| 686,052 | 11/1901 | Golding . |
| 834,828 | 10/1906 | Lutz . |
| 917,328 | 4/1909 | Lutz . |
| 2,316,166 | 4/1943 | Huguelet . |
| 2,741,499 | 4/1956 | Kussmaul . |
| 3,351,699 | 11/1967 | Merckle ................................ 138/157 |
| 3,603,625 | 5/1970 | Cottrell et al. ..................... 287/187.36 |
| 3,782,420 | 1/1974 | Kolb et al. ............................. 138/156 |
| 4,951,716 | 8/1990 | Tsunoda et al. ........................ 138/162 |
| 5,161,580 | 11/1992 | Klug ........................................ 138/92 |

FOREIGN PATENT DOCUMENTS

| | | |
|---|---|---|
| 832007 | 2/1952 | Germany . |
| 1493410 | 11/1977 | United Kingdom . |
| 2206744 | 1/1989 | United Kingdom . |

OTHER PUBLICATIONS

Panduit Catalog P. 115.

Primary Examiner—David Scherbel
Assistant Examiner—Patrick F. Brinson
Attorney, Agent, or Firm—Charles R. Wentzel; Mark D. Hilliard; Robert A. McCann

[57] ABSTRACT

A duct fitting for joining a plurality of duct sections of a wiring duct network comprising a fitting base and a fitting cover having corresponding tabs and slots for providing a simple assembly operation for fixing the cover to the base. The fitting base has tabs formed on the marginal edges of its sidewalls which cooperate with slots formed on flanges of the cover. The sidewalls of the base are flexed inwardly and then released to engage the tabs with the slots of the cover.

12 Claims, 7 Drawing Sheets

5,469,893

TAB AND SLOT FIBER OPTIC FITTING

FIELD OF THE INVENTION

The present invention relates to a fitting for joining wiring duct sections of a duct network, and more particularly to a tab and slot arrangement for a thermoplastic duct fitting.

BACKGROUND OF THE INVENTION

In the electronics and telecommunications industries duct networks are common for protecting and carrying various bundles of wires and fiber optic cables. Because the cables and wires are routed around corners and include numerous branches and splits in all different directions, the duct networks must include fittings that connect the multiple duct sections to provide for all the desired paths. The duct fittings are formed having many configurations such as T-shaped, right-angled and cross-shaped. Additionally, duct fittings often include removable covers to aid in installation and maintenance of the cables and wires.

The following examples of duct fittings are known in the prior art: U.S. Pat. No. 834,828 to Lutz; U.S. Pat. No. 917,328 to Lutz; U.S. Pat. No. 3,603,625 to Cottrell et al.; U.S. Pat. No. 4,951,716 to Tsunoda et al. and U.S. Pat. No. 5,161,580 to Klug.

Many of the prior art duct fittings require complicated multi-step assembly operations that include a bending or folding action of a tab into a slot in order to engage the base with the fitting cover. Removal of these covers also includes similar complicated multi-step unfolding operations of the tabs. Other duct fittings and covers utilize engagement means such as velcro pads that do not adequately prevent inadvertent removal of the cover from the fitting in many of the uses for the duct networks. Furthermore, many of these prior art duct fittings are expensive to manufacture due to their complicated tab and slot arrangements with special side walls and intricately formed slots.

SUMMARY OF THE INVENTION

It is therefore an object of the present invention to provide an improved duct fitting for connecting multiple duct sections of a wiring duct network.

It is another object of the present invention to provide a duct fitting with a removable cover that minimizes the assembly operations of the cover to the fitting while maintaining engagement strength to prevent inadvertent removal of the cover.

It is still another object of the present invention to provide a duct fitting that is easier and cheaper to manufacture.

A fitting for joining a plurality of duct sections of a cable duct network comprising a base member including a floor section, a plurality of sidewalls perpendicularly disposed and extending from an interior face of the floor section, a plurality of tabs formed on the marginal edges of the sidewalls and extending perpendicularly away from an exterior surface of the sidewalls, a cover member, engageable with the base member, having a lid section and including flange portions extending perpendicularly from an interior face of the lid section and a plurality of slots formed in the flange portions corresponding to the tabs of the base member.

DESCRIPTION OF THE PREFERRED EMBODIMENT

Figure 1:
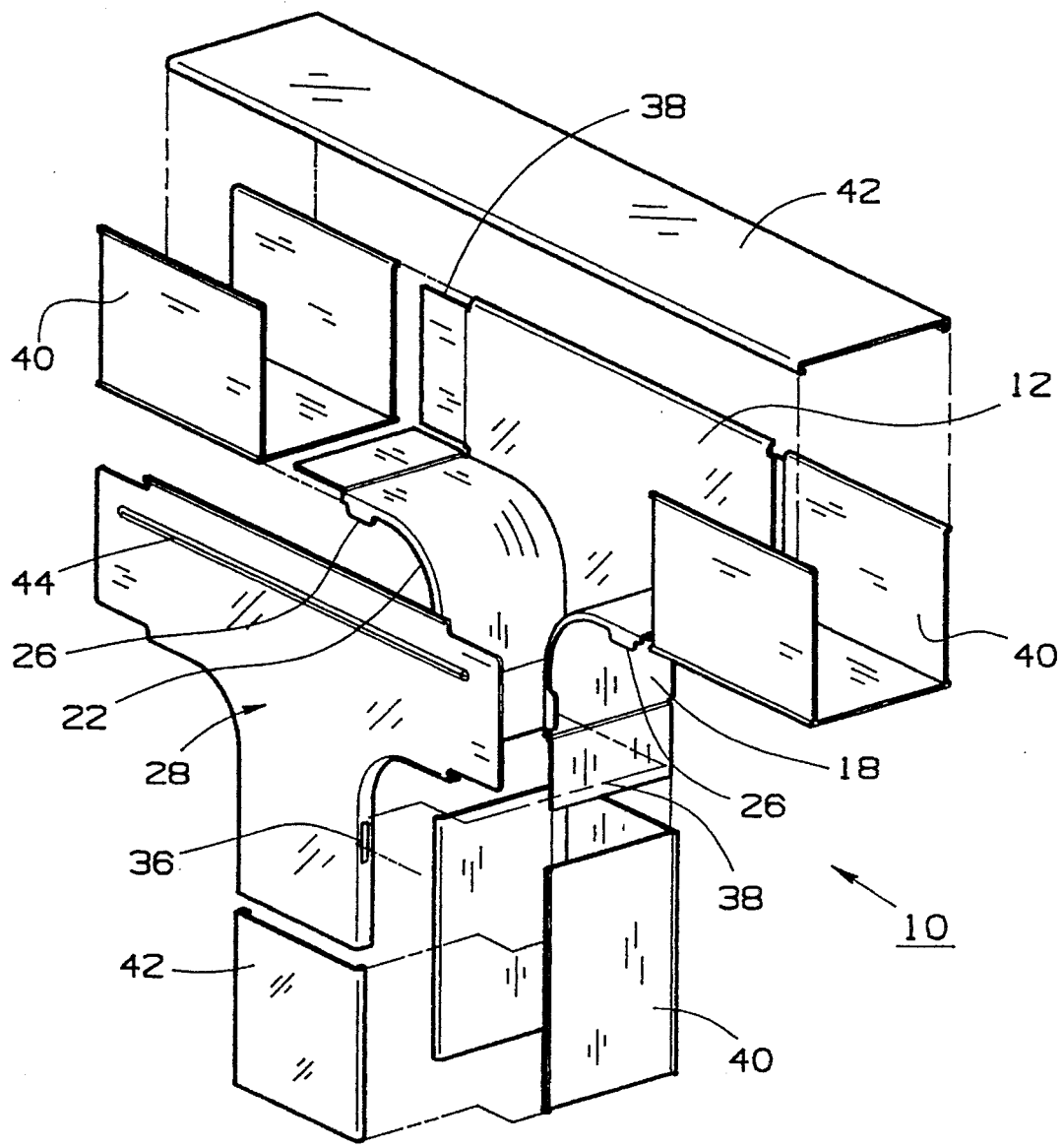
FIG. 1 is an exploded view of one embodiment of a duct fitting including the tab and slot arrangement of the present invention.
Figure 2:
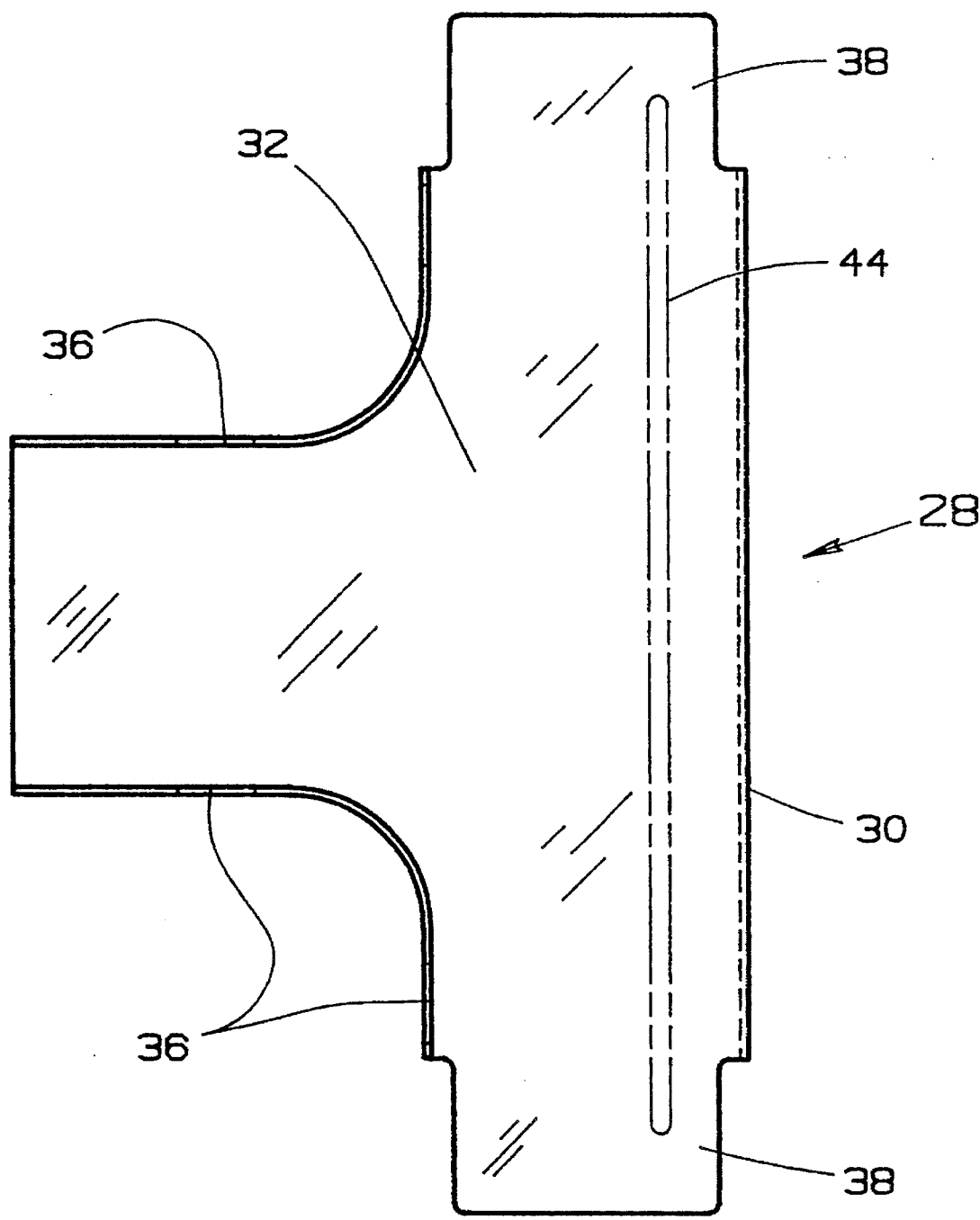
FIG. 2 is a top inside view of a duct fitting cover of FIG. 1.

A duct fitting embodying the concept of the present invention is designated generally by the reference numeral 10 in the accompanying drawings. Duct fitting 10 includes a fitting base 12 and a fitting cover 28. Fitting base 12 and fitting cover 28 are both thermo-formed into T-shaped pieces from sheets of plastic.

Figure 3:
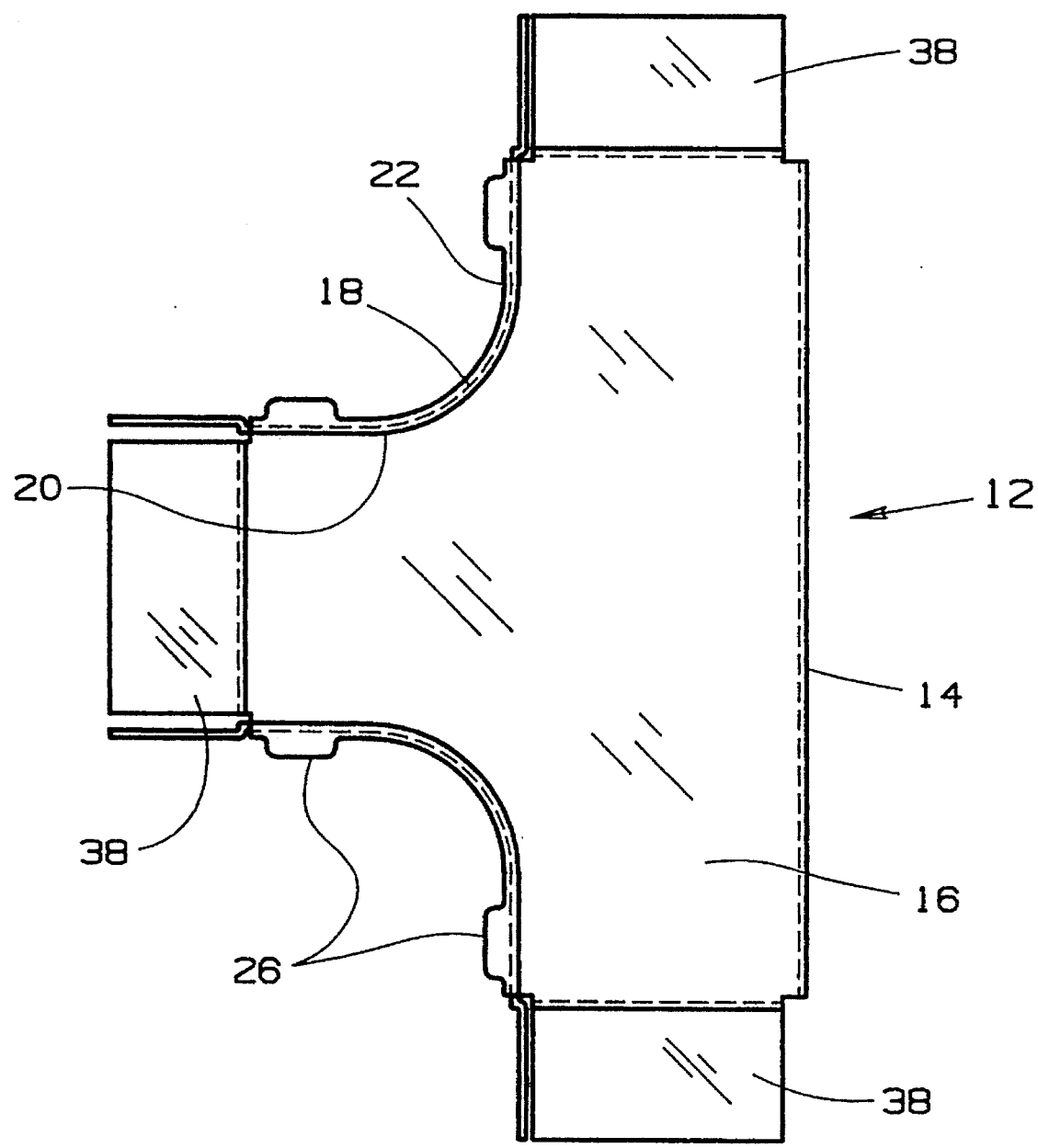
FIG. 3 is a top view of a duct fitting base of FIG. 1.

Fitting base 12 has a floor section 14 with an interior face 16 and a pair of sidewalls 18 extending perpendicularly from the sides of floor section 14 such that an interior surface 20 of each sidewall 18 is adjacent the interior face 16 of floor section 14. As can be seen in FIG. 1, sidewalls 18 are formed on only the two sides of fitting base 12 for the T-shaped design that correspond to the sides of the stem of the "T" and the bottom of the top crossing portion. While sidewalls 18 are relatively stiff, they do have some resiliency and are flexible with respect to the floor section 14. As can be seen in FIGS. 1 and 3, lips 22 are formed along the marginal edges of sidewalls 18 and are directed away from an exterior surface 24 of each sidewall 18. A number of tabs 26, in this case four, are formed at spaced distances along lips 22. Tabs 26 are extensions of lips 22 and are therefore also formed on the marginal edges of sidewalls 18 at right angles to and extending away from the exterior surface 24 of sidewalls 18.

Fitting cover 28 has a lid section 30 with an interior face 32 and a pair of flange portions 34 extending perpendicularly from the sides of the interior face 32 of lid section 30 corresponding to sidewalls 18 of base 12. A number of slots 36, in this case four, are formed at spaced distances along flange portions 34 corresponding to tabs 26 of the duct fitting base 12.

Figure 4:
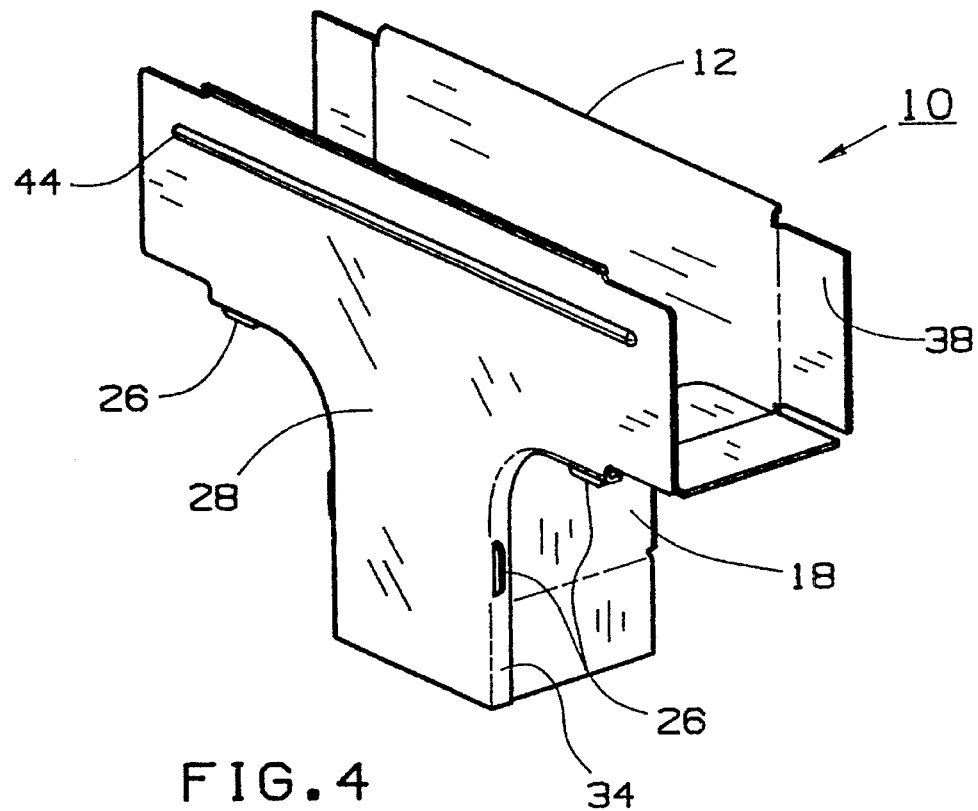
FIG. 4 is a perspective view of the duct fitting of FIG. 1 shown in the assembled state.
Figure 5:
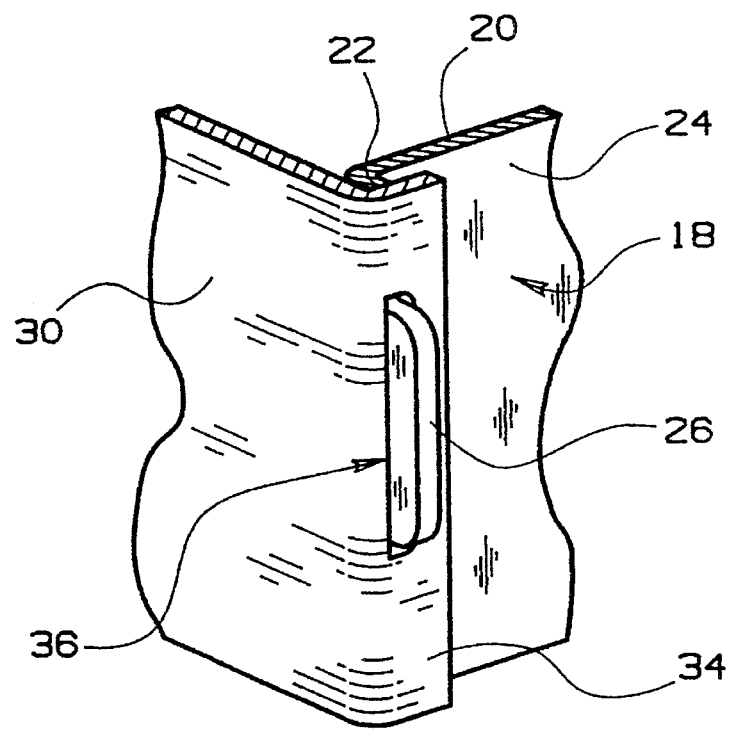
FIG. 5 is an enlarged perspective view of a portion of the duct fitting showing the tab and slot connection arrangement.

As can be seen in FIGS. 4 and 5, tabs 26 cooperate with slots 36 to secure fitting cover 28 to fitting base 12 to comprise the duct fitting 10 for connecting a number of separate ducts together to route fiber optic cables or the like as part of a duct network. The slots 36 on the underside of the crossing top part of the "T" are initially slid onto corresponding tabs 26 and then the sidewalls 18 of the stem part of the "T" of base 12 are flexed inwardly and released when tabs 26 are in position to engage corresponding slots 36 to secure cover 28 to base 12.

In order to remove fitting cover 28, sidewalls 18 along the stem of the "T" are squeezed towards each other a sufficient distance to disengage tabs 26 from slots 36. The fitting cover 28 is then slid in a direction to disengage the remaining tabs 26 from slots 36 on the underside of the crossing top part of the "T". This allows for quick and easy access to the interior of fitting 10 for maintenance rerouting of wires or for any other purpose.

By having tabs 26 extending at right angles to sidewalls 18, slots 36 can be formed solely on the flange portions 34. Furthermore, with the tabs 26 formed at the marginal edges of sidewalls 18, the flange portions 34 extending perpendicularly from the edges of fitting cover 28 which contain slots 36, can be relatively short in length. This arrangement allows for a fitting that provides easy access to the interior of the fitting, and that is cheaper and easier to manufacture.

The fitting base 12 and fitting cover 28 also include tongue portions 38 extending from ends of fitting 10 that engage with other duct sections 40 of the duct network. As can be seen in FIGS. 1 and 3, fitting 10 engages the duct sections 40 by creating an interlocking fit with duct sections 40 by having tongues 38 formed offset either inwardly or outwardly from floor section 14. The inward offsetting of the tongue portions 38 that engage a floor of one of the duct sections to be joined allows for the floors of the duct sections 40 to be uniform to the fitting 10. The outward offset tongue portions 38 in turn cover the outer sidewalls of the joined duct sections 40.

A support rib 44 is also formed on the outside of cover 28 as shown in FIG. 4. Support rib 44 provides additional rigidity for the top cross part of the "T" of lid section 30.

It can also be seen in FIG. 1 that standard duct covers 42 that cover the separate duct sections 40 can also be used to cover the crossing top part of the "T" as both the base 12 and cover 28 include a lip to engage a duct cover 42.

While a T-shaped fitting has been shown and described above, there are a wide variety of shapes and configurations for duct fittings to which the tab and slot arrangement of the present invention would be applicable.

A number of other possible embodiments of the tab and slot arrangement for a duct fitting are shown in FIGS. 6–10. In all of these other embodiments in order to form the fitting the sidewalls of the base are flexed inwardly and then released when the tabs are in position to engage the slots of the cover. It is noted that in the embodiments shown in FIGS. 6–10, the fitting base and fitting cover fully comprise the duct fitting without the need for any additional duct covers.

Figure 6:
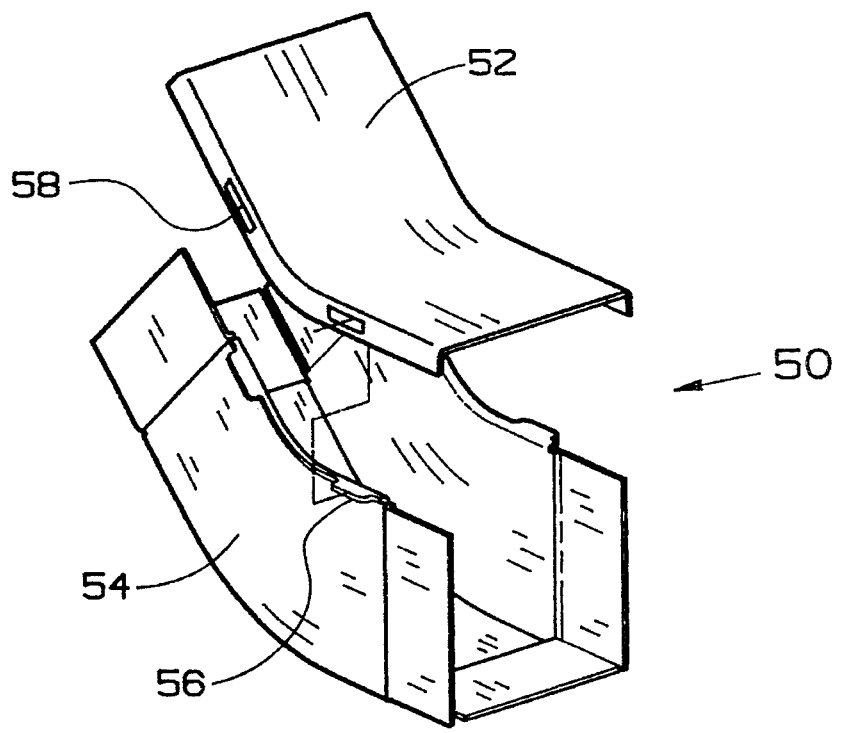
FIG. 6 is a perspective view of another embodiment of the duct fitting of the present invention in the disassembled state.

FIG. 6 shows another embodiment of the present invention where tabs 56 of fitting base 54 engage slots 58 of fitting cover 52 to comprise an inside turning curved fitting 50.

Figure 7:
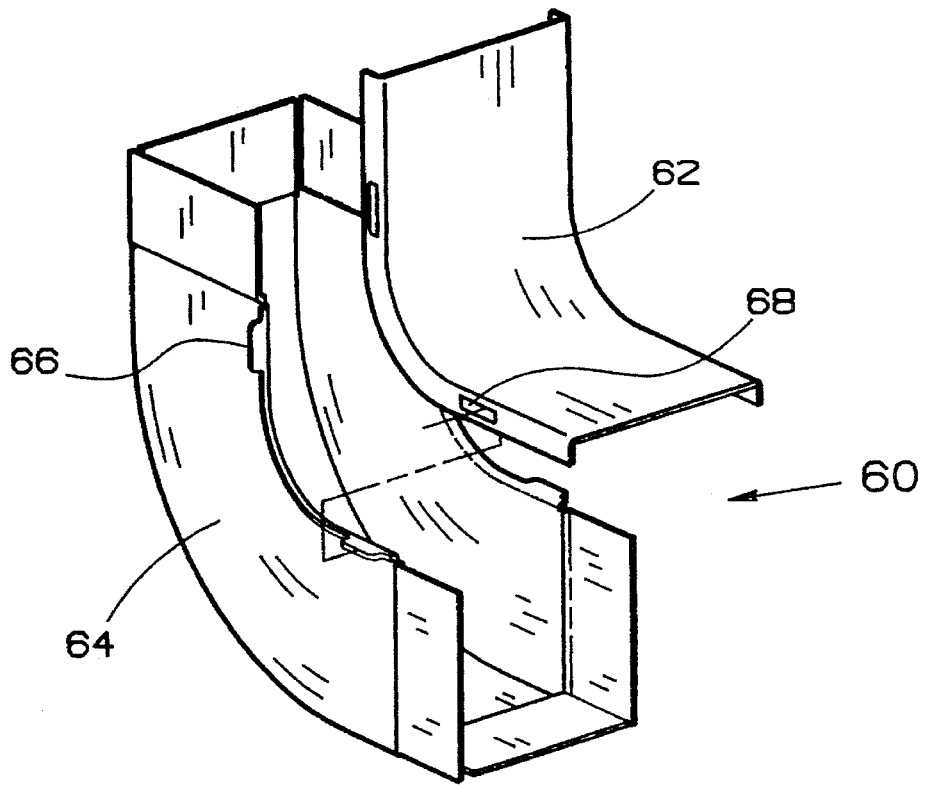
FIG. 7 is a perspective view of another embodiment of the duct fitting of the present invention in the disassembled state.

FIG. 7 shows another embodiment of the present invention in which tabs 66 of fitting base 64 engage the slots 68 of fitting cover 62 to comprise an inside turning right-angled fitting 60.

Figure 8:
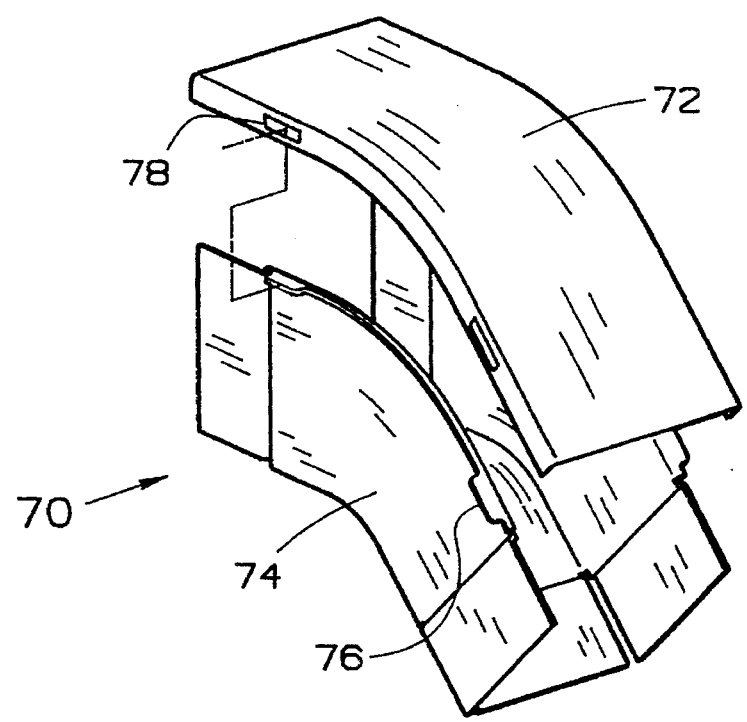
FIG. 8 is a perspective view of another embodiment of the duct fitting of the present invention in the disassembled state.

FIG. 8 shows yet another embodiment of the present invention in which tabs 76 of fitting base 74 engage slots 78 of fitting cover 72 to comprise outside turning curved fitting 70.

Figure 9:
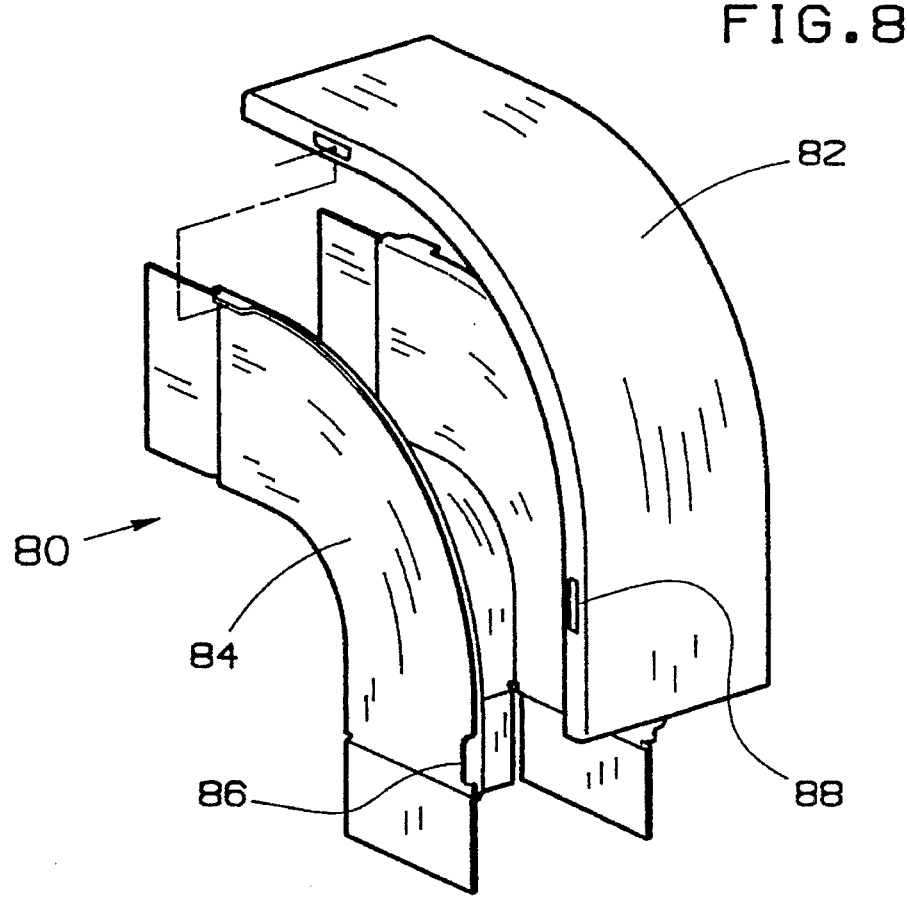
FIG. 9 is a perspective view of another embodiment of the duct fitting of the present invention in the disassembled state.

FIG. 9 shows another embodiment of the present invention in which tabs 86 of fitting base 84 engage slots 88 of fitting cover 82 to form outside turning right-angled fitting 80.

Figure 10:
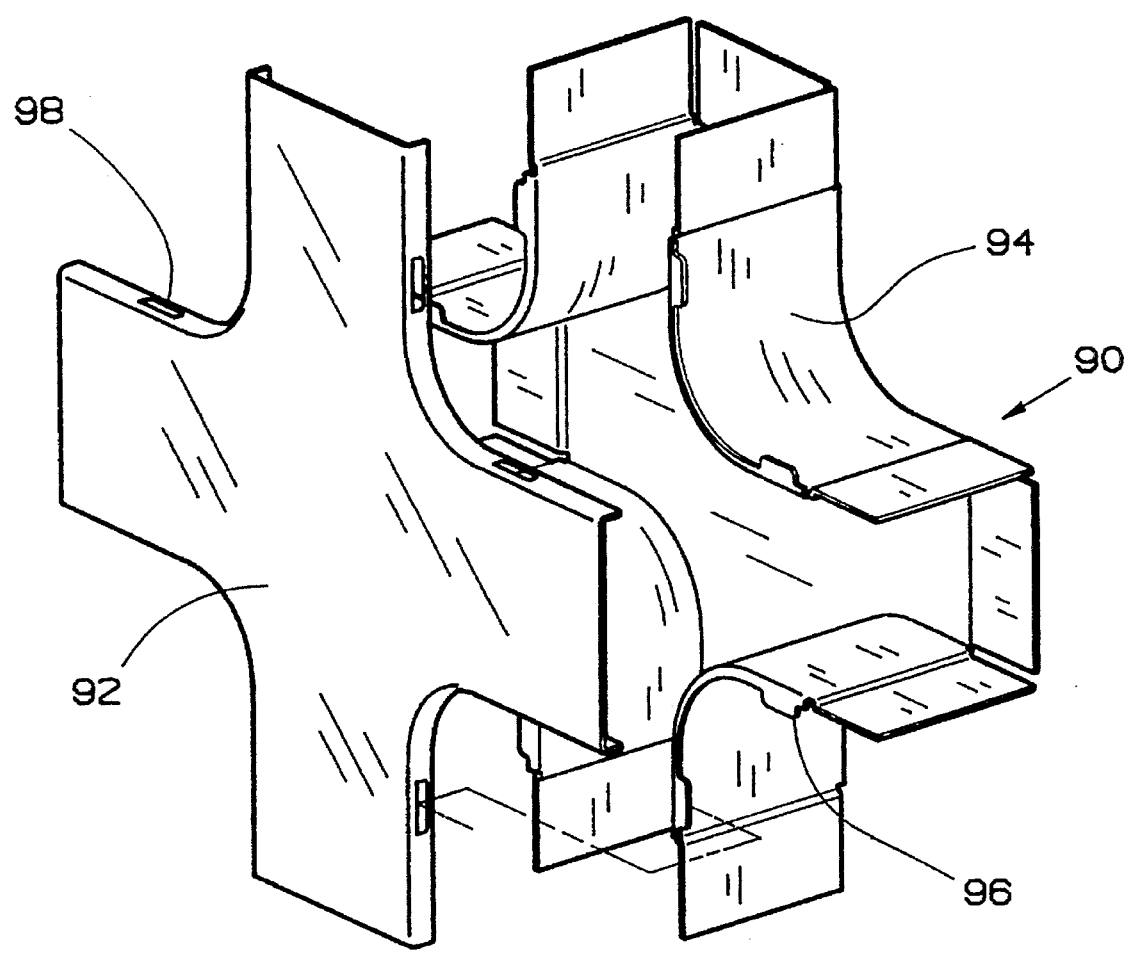
FIG. 10 is a perspective view of another embodiment of the duct fitting of the present invention in the disassembled state.

FIG. 10 shows another embodiment of the present invention in which tabs 96 of fitting base 94 engage slots 98 of fitting cover 92 to form cross-shaped fitting 90.

While the particular embodiments of the present invention have been shown and described, it will be obvious to those skilled in the art the changes and modifications may be made without departing from the invention and its broader aspects. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A fitting for joining a plurality of duct sections of a cable duct network comprising:

a base member including a floor section;

a plurality of sidewalls perpendicularly disposed and extending from an interior face of the floor section to a marginal edge at a distal end of the sidewall;

a plurality of narrow tabs formed on the marginal edges of the sidewalls and disposed so as to extend perpendicularly away from a distal end of an exterior surface of the sidewalls;

a cover member, engageable with the base member, having a lid section and including flange portions extending perpendicularly from an interior face of the lid section; and a plurality of slots formed in the flange portions disposed for engagement with corresponding tabs of the base member.

2. A fitting in accordance with claim 1, wherein the base and cover member are plastic.

3. A fitting in accordance with claim 2, wherein the base member and cover member are thermo-formed.

4. A fitting in accordance with claim 3, wherein the sidewalls are substantially rigid but have sufficient flexibility with respect to the floor section to be inwardly bent to allow for engagement of the tabs to the slots.

5. A fitting in accordance with claim 4, further including coupling means formed at a plurality of ends of the cover member, the floor section, and the sidewalls respectively for coupling the fitting to the plurality of duct sections.

6. A fitting in accordance with claim 5, wherein the coupling means include tongue extensions that engage with the plurality of duct sections.

7. A fitting in accordance with claim 6, wherein the fitting comprises a T-shaped member.

8. A fitting for a cable duct network in accordance with claim 6, wherein the fitting comprises a cross-shaped member.

9. A fitting for a cable duct network in accordance with claim 6, wherein the fitting comprises an inside turning right-angled member.

10. A fitting for a cable duct network in accordance with claim 6, wherein the floor member comprises an outside turning right-angled member.

11. A fitting for a cable duct network in accordance with claim 6, wherein the floor member comprises an inside turning curved member.

12. A fitting for a cable duct network in accordance with claim 6, wherein the floor member comprises an outside turning curved member.

* * * * *